US012770745B2

(12) United States Patent
Sedwick et al.

(10) Patent No.: US 12,770,745 B2
(45) Date of Patent: Oct. 20, 2026

(54) IN-SPACE PROPULSION SYSTEM THAT EMPLOYS A NUCLEAR FUSION REACTOR WITH CENTRIFUGAL MIRROR CONFINEMENT

(71) Applicants: Raymond John Sedwick, University Park, MD (US); Adil B. Hassam, Rockville, MD (US); Jerry Lee Carson, Olney, MD (US); Carlos A. Romero-Talamas, University Park, MD (US); Ian George Abel, London (GB)

(72) Inventors: Raymond John Sedwick, University Park, MD (US); Adil B. Hassam, Rockville, MD (US); Jerry Lee Carson, Olney, MD (US); Carlos A. Romero-Talamas, University Park, MD (US); Ian George Abel, London (GB)

( * ) Notice: Subject to any disclaimer, the term of this patent is extended or adjusted under 35 U.S.C. 154(b) by 844 days.

(21) Appl. No.: 17/970,613

(22) Filed: Oct. 21, 2022

(65) Prior Publication Data

US 2024/0347218 A1 Oct. 17, 2024

Related U.S. Application Data

(60) Provisional application No. 63/262,865, filed on Oct. 21, 2021.

(51) Int. Cl.
*G21B 1/05* (2006.01)
*B64G 1/40* (2006.01)

(52) U.S. Cl.
CPC ............. *G21B 1/052* (2013.01); *B64G 1/408* (2013.01)

(58) Field of Classification Search
CPC ........... G21B 1/052; G21B 1/05; B64G 1/408
USPC ......................... 376/100, 121, 140, 141, 146
See application file for complete search history.

(56) References Cited

U.S. PATENT DOCUMENTS

| | | | | |
|---|---|---|---|---|
| 6,888,907 | B2 * | 5/2005 | Monkhorst | G21B 1/052 376/147 |
| 9,082,516 | B2 * | 7/2015 | Slough | G21B 1/052 |
| 9,462,669 | B2 * | 10/2016 | Prater | H05H 1/16 |
| 9,822,769 | B2 * | 11/2017 | Cohen | G21B 1/052 |
| 2001/0043661 | A1 * | 11/2001 | Emrich | G21B 1/052 376/140 |

OTHER PUBLICATIONS

Ellis, "An experiment to test centrifugal confinement for fusion", Physics of Plasmas 8, No. 5 (2001): 2057-2065. (Year: 2001).*
White, "Centrifugal particle confinement in mirror geometry", Physics of Plasmas 25, No. 1 (2018). (Year: 2018).*
Huang, "Centrifugal confinement fusion thruster", Radiation Effects and Defects in Solids 179, No. 11-12 (2024): 1537-1541. (Year: 2024).*

* cited by examiner

*Primary Examiner* — Jack W Keith
*Assistant Examiner* — Daniel Wasil
(74) *Attorney, Agent, or Firm* — Lambert Shortell & Connaughton; David J. Connaughton, Jr.; Justin P. Tinger

(57) ABSTRACT

A system and method for employing centrifugal mirror confinement in a nuclear fusion reactor for in-space propulsion and power generation. Centrifugal confinement represents an advancement beyond traditional mirror devices by further confining the fusion fuel and inhibiting instability growth, while still offering a simple magnet geometry and allowing a controllable fraction of the charged fusion products to leave each end of the mirror.

8 Claims, 4 Drawing Sheets

IN-SPACE PROPULSION SYSTEM THAT EMPLOYS A NUCLEAR FUSION REACTOR WITH CENTRIFUGAL MIRROR CONFINEMENT

CROSS-REFERENCE TO RELATED APPLICATIONS

This application claims the benefit of priority of U.S. Provisional Application No. 63/262,865 filed on Oct. 21, 2021, the content of which is relied upon and incorporated herein by reference in its entirety.

PRIOR ART

U.S. Patent Documents

| | | | |
|---|---|---|---|
| 6,888,907 B2 | May 2005 | Monkhorst, et al. | G21B1/052 |
| 9,082,516 B2 | July 2015 | Slough | G21B1/052 |
| 9,524,802 B2 | December 2016 | Slough | G21B1/052 |
| 9,822,769 B2 | November 2021 | Cohen, et al. | G21B1/052 |
| 10,319,480 B2 | June 2019 | Wong | 376/121 |
| 2001/0043661 A1 | November 2001 | Emrich | G21B1/052 |
| 2008/0226011 A1 | September 2008 | Barnes | 376/121 |

OTHER REFERENCES

Adams, R.; Polsgrove, T.; Fincher, S.; Fabinski, L.; Maples, C.; Miernik, J.; Stratham, G.; Cassibry, J.; Cortez, R.; Turner, M.; Santarius, J.; Percy, T., Presentation at Advanced Space Propulsion Workshop 2010, Colorado Springs, CO, United States, 15-17 Nov. 2010.

Setthivoine You, "Helicity Drive: A Novel Scalable Fusion Concept for Deep Space Propulsion," AIAA 2020-3835 Session: Fusion, Alternative Nuclear, and Antimatter Concepts, Published Online: 17 Aug. 2020 https://doi.org/10.2514/6.2020-3835.

Ellis, R. F., A. B. Hassam, S. Messer and B. R. Osborn, "An experiment to test centrifugal confinement for fusion," Physics of Plasmas, 8, 2057 (2001) 23.

White, Roscoe, Hassam, Adil, and Brizard, Alain, "Centrifugal particle confinement in mirror geometry," Physics of Plasmas 25, 012514 (2018); doi: 10.1063/1.5003359.

FIELD OF THE INVENTION

The disclosed scenarios relate generally to the field of plasma physics and more specifically to systems and methods for producing power and propulsive thrust from a fusion reactor.

BACKGROUND OF THE INVENTION

Fusion reactors can be broadly classified according to their method of confinement and compression of plasmas. Magnetic confinement includes methods that use external magnet coils to produce a magnetic field, and those using fields produced by currents within the plasma, so-called pinch confinement. Of those using external magnets, these systems may be closed, i.e., tokamaks, or open, the latter of which mirror devices are an important class. Inertial confinement uses external particle beams or lasers to compress the reactants to produce pulsed fusion. A hybrid approach, magneto-inertial confinement (MIF) uses magnetic fields to suppress cross-field transport, while mechanical compression is used to achieve fusion conditions.

U.S. Pat. No. 9,822,769 describes a fusion powered rocket based on a field-reversed configuration reactor wherein cold propellant gas is introduced into the scrape off layer to augment the mass flow of the scrape off layer. Said additional mass flow is subsequently introduced into the reactor chamber, heated by fusion reaction products and leaves the system as warm propellant along with fusion products through the magnetic nozzle. The system thus produces thrust from the fusion products and thrust from augmentation by the cold propellant introduced into the scrape off layer. The system includes a claim by which plasma detachment from the magnetic field lines in the nozzle is achieved by forming a neutral stream by neutralizing the expelled propellant. The system claims configurations for fusion fuels comprising deuterium and helium-3 and propellants, i.e., augmentation mass flow comprising deuterium and hydrogen.

U.S. Pat. No. 9,082,516 describes systems and methods for thermonuclear fusion-based power generation and engine thrust generation. The system establishes a Field Reversed Configuration (FRC) plasma, wherein said plasma is magnetically confined. A metal shell is collapsed about the FRC plasma using inductive forces, said compression which achieves conditions necessary for a fusion reaction. The fusion reaction vaporizes the metal shell, and the collective fusion products and metal plasma then expand through a divergent magnetic field to produce thrust.

Adams, et al (Advanced Space Propulsion Workshop 2010, Colorado Springs, CO, United States, 15-17 Nov. 2010, NTIS Issue Number 201119) presents a conceptual design for a Z-pinch thruster, potentially capable of high thrust and high specific impulse propulsion. The system is envisioned as comprising annular nozzles with deuterium-tritium (D-T) fuel and a lithium mixture as a cathode. The concept includes a description of vehicle configuration, thrust coil configuration, power management, and it provided a structural analysis of the magnetic nozzle, and an overview of the thermal management system.

You (AIAA 2020-3835, Session: Fusion, Alternative Nuclear, and Antimatter Concepts) presents a magneto-inertial fusion propulsion concept based on magnetic reconnection to heat fusion plasma. Magnetic reconnection is described as a fast, high-power ion heating mechanism that provides natural plasma self-organization for stable confinement. It requires modest magnetic compression ratios, which reduce system complexity. Analysis indicates that thrust power from 10s of kW to GW are possible.

Ellis, et al (Physics of Plasmas, 8, 2057, 2001) provides a description of the physics and operation of centrifugal mirror. The paper provides an overview of the underlying principles related to magnetized particle motion, magnetohydrodynamic equilibrium, plasma transport, and stability. It also describes the components of the Maryland Centrifugal Experiment (MCX) intended to demonstrate centrifugal confinement. The system comprised an axial magnetic field, the vacuum vessel, the central core electrode for biasing the plasma, the capacitor discharge system, and insulating end assemblies. Anticipated operational characteristics were projected, including B-field of 0.2 to 2 T, mirror ratios of 3-10, potential less than 20 kV, number densities of $10^{19}$ to $10^{20}$ #/$m^3$, Te~Ti~ 10-100 eV, and rotational Mach numbers of 3-6.

White, et al. (Physics of Plasmas 25, 012514 (2018); doi: 10.1063/1.5003359) offers an analysis of centrifugal confinement that includes higher fidelity treatment of particle kinematics, vis-à-vis cyclotron motion around magnetic field lines. The analysis considers finite Larmor motion in highly magnetized plasmas and combines this motion in the lab frame with the azimuthal velocity. A significant result of the analysis was the prediction of electron losses from low rotation of the plasma near the plasma edge, due to wall effects. The analysis also includes a configuration where the field strength of one mirror magnet was reduced, so that it effectively became a magnetic nozzle. Fusion products departed the reactor and produced a fraction of a Newton of thrust at 60,000 seconds specific impulse.

The analyses of fusion-based propulsion tend to focus on the reactor and on characterizing the theoretical jet power that can be extracted from them. However, the high temperatures of fusion products potentially make detachment from the magnetic nozzle problematic, if not impossible. This condition, following from Alfven's "frozen-in" theorem represents a practical problem for fusion propulsion systems. U.S. Pat. No. 9,822,769 addresses this concern, but only partially. Its specific claim involves neutralizing the plasma in the divergent magnetic field of the nozzle, and in fact, this is a method of mature prior art currently used in existing electric propulsion systems. However, in these electric propulsion systems the ions are typically not magnetized and the electros are injected downstream of any magnetic field to form a quasi-neutral plasma. Without actual ion-electron recombination, injection of the electrons to simply neutralize the space charge is ineffective. As the electrons are injected in a high-field area, cross-field transport to reach the ions becomes problematic.

Further discussion states that ions may be able to detach through inertial processes, a separate mechanism from the method identified in its claims. While the method claimed may be suitable for low thrust, i.e., low mass flow systems, the second mechanism results in a necessary but not sufficient condition for detachment, since electrons must also detach, and they cannot do so by inertial mechanisms.

BRIEF SUMMARY OF THE INVENTION

The object of the disclosed invention is to employ Centrifugal Confinement Fusion for in-space propulsion and power generation. Linear mirror devices for fusion plasma confinement are potentially lower mass due to their simpler axial magnet geometry. However, end losses via ion scattering into the loss cones can be quite significant unless large mirror ratios are employed. Similarly, inherent plasma instabilities enhance cross-field transport and further increase plasma losses unless the aspect ratio of the mirror device is very large. Both effects more than offset any mass advantages of a typical mirror device. Nevertheless, as open topology devices, they are well-suited to employment for direct-drive propulsion.

Centrifugal confinement solves these performance issues and more by inducing a high-velocity, high-shear azimuthal rotation into the plasma through the application of a radial electric field. The centrifugal acceleration drives the plasma toward the axial mid-plane creating a potential barrier that most of the plasma cannot overcome, effectively closing the loss cones to the fuel. The flow shear cuts off instabilities before they have a chance to evolve, effectively stabilizing the plasma and promoting classical cross-field transport. Finally, the power input to drive the plasma rotation and overcome the shearing forces provides a convenient mechanism to recirculate power into the plasma without the need for radio frequency (RF) or neutral beam heating.

While the loss cones are closed to most of the fuel, the energetic charged fusion products launched into the loss cones are still free to escape the mirror ends. These products can then be coupled downstream to a lower temperature propellant flow, which is thereby heated to expand through a magnetic nozzle to produce thrust. Through ambipolar forces the flow remains quasi-neutral and nozzle detachment is enhanced over what would be seen by the high temperature fusion products alone due to the increased collisionality of the lower temperature propellant plasma. In the upstream direction these energetic charged fusion products can be converted directly into electrical power. One approach, the Standing Wave Direct Energy Converter (SWDEC) decelerates the ions incrementally through the application of an alternating RF potential. The resulting RF power can be coupled through a device such as a Cockroft-Walton charge pump to provide the high voltage to drive the plasma rotation.

For neutron generating fusion fuels (D-T, D-D) the neutron power can be absorbed into a blanket of fluid and coupled via a heat exchanger to a high specific power thermodynamic power converter such as a Brayton Cycle turboshaft. For low power operation when the propulsion system is not operating, the waste heat from this cycle can be shunted to relatively low mass radiators. However, when the propulsion system is operational, the waste heat can be deposited into the propellant flow to preheat and vaporize the flow, obviating the need for heavy radiators.

For aneutronic fusion fuels such as p-$^{11}$B, in addition to the direct conversion of the alpha particle energy, the high intensity bremsstrahlung can be absorbed and converted thermionically into electrical power. The waste heat from this conversion process is then radiated away at a relatively high temperature, again obviating the need for heavy radiators.

BRIEF DESCRIPTION OF DRAWINGS

Preferred and alternative embodiments are described in detail below with reference to the following drawings.

DETAILED DESCRIPTION OF THE INVENTION

The Reactor

Figure 1:
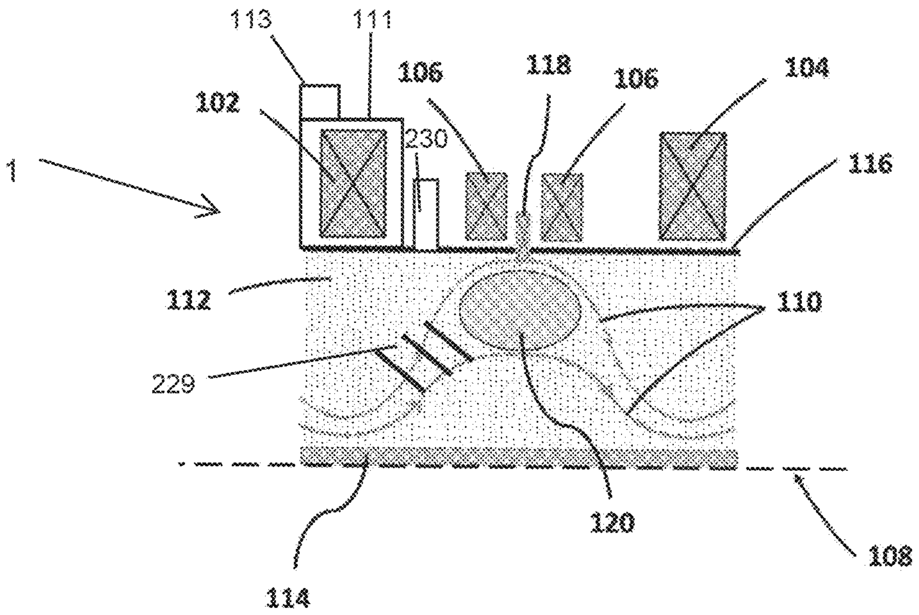
FIG. 1 is a schematic of the centrifugal mirror device for confining a plasma

As shown in FIG. 1, the plasma in a magnetic mirror device is contained within a cylindrical volume with strong magnets, the "mirrors," at either end 102, 104 as well as possibly using secondary magnets 106 to help shape the field. The dashed line 108 indicates the centerline of rotational symmetry in the device. The magnetic field lines 110, 227 in mirror devices are primarily axial with radial components where the strength of the field is spatially varying near the magnets. Field lines in the radial-axial plane are referred to as poloidal, thus first poloidal magnetic field 110 and second poloidal magnetic field 227. A first poloidal electric field 229 is substantially perpendicular to first poloidal magnetic field. Each charged particle in the plasma is approximately bound to an individual magnetic line about which it gyrates at a high frequency determined by its energy and charge-to-mass ratio (for example, millions of times per second). The particles also move along the lines of force but are reflected back and forth between the mirror magnets at each end creating an overall helical motion around the field line. Insulation 111 surrounds the magnetic coil 102 for insulation, while cooling system 113 maintains the magnet material below its critical temperature.

However, mirrors are leaky, and particles entering the loss cone—a region in velocity space of the particle distribution where the particle's velocity is sufficiently close to the axial direction—will escape. Collisions within the plasma volume continuously scatter particles into this region making fuel containment difficult without very strong magnets. In a centrifugally confined plasma, an electric field 112 imposed radially on the plasma will interact with the magnetic field 110 to force the charged particles to take on an azimuthal drift velocity as determined by the local cross product of the electric and magnetic fields. The radial electric field is imposed by a central electrode 114 and a ground 116. This ground is shown as a cylindrical outer electrode, likely a transparent wire mesh, running the full length of the mirror, but an alternative embodiment would employ a ring electrode 118 that just contacts the outermost confining magnetic field line.

At sufficiently high rotational speeds, the azimuthal velocity component creates a radially outward inertial (centrifugal) force on the plasma volume (toward the top in the figure) that is comparable to other forces. The component of this radial force along the magnetic field lines pushes the plasma both radially outward from the symmetry axis and axially toward the mid-plane of the mirror. The plasma is thereby confined within an annular volume 120, coaxial with the magnetic field. Because the plasma is both mirror and centrifugally confined, and because the space environment provides a hard vacuum, the plasma containment scheme does not require a vessel wall. Accordingly, it is possible to instantiate the reactor open to space with minimal physical containment and associated structure.

For thermonuclear fusion to occur, the reaction kinetics must be sufficiently fast, and the heat balance of the reaction must be such that it is self-sustaining. Reaction kinetics are a function of particle density of participating species and reaction cross-sections. Nuclei must collide and in so doing, overcome mutually repulsive coulomb forces. The conditions necessary for this are that the particles be of sufficient velocity, and that there is a sufficient probability of collision. The first of these conditions implies a high temperature. The second implies both a sufficient concentration of particles and reaction cross-section.

The reaction cross-section in turn is a function of temperature and the characteristics of the participating nuclei. The deuterium-tritium (D-T) reaction is technologically the most accessible approach for controlled nuclear fusion. Other fusion reactions such as deuterium-deuterium (D-D), deuterium-helium-3 (D-$^3$He), and proton-boron-11 (p-$^{11}$B) produce fewer or no neutrons but require higher temperatures and number densities. The disclosed invention is capable of operating with any of these fuels, constrained primarily by limits in technology for materials, high field magnets, and radiation tolerance.

The Propulsion System

Figure 2:
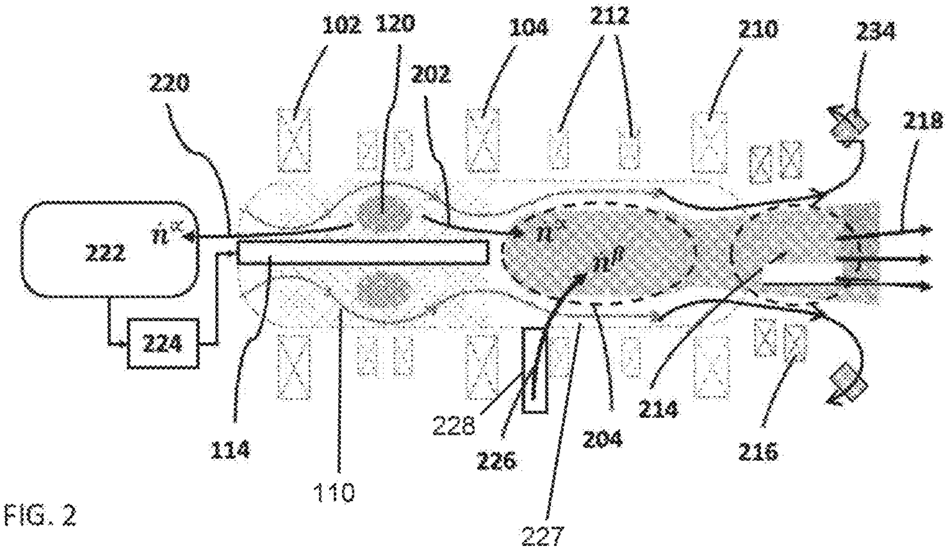
FIG. 2 is a schematic of the centrifugal mirror device integrated with a propulsion system.

Thermonuclear plasmas are highly energetic, but if the fusion products are used directly as propellant this results in an inherently low thrust because of the small mass flow from the reactor. However, mixing high energy fusion products with high density, low temperature, ("warm") plasmas will increase thrust, but at the expense of specific impulse or exit velocity. In FIG. 2, high energy fusion products 202 pass out of the reactor where the fusion plasma 120 is confined and into a downstream energy transfer region 204 where it mixes with the warm plasma. The warm plasma is also contained in a magnetic mirror confinement scheme with a primary mirror magnet 210 and possibly one or more secondary magnets 212 for field shaping. The fusion products collide numerous times with colder ions, transferring energy as they collide. The higher energy density plasma flows through a downstream magnetic nozzle region 214 formed with additional magnets 216 where it is accelerated 218 to produce thrust.

The centrifugal mirror reactor 1 has an interface with the propulsion system, and depending on the type of power conversion system, with said power conversion system, as well. Physically, the interface comprises the same mirror magnets that are located at either end of the centrifugal mirror reactor 102, 104, an aperture through which charged fusion products leave the reactor, and a system for conveying power to the reactor biasing system 224 applied at the central electrode 114. On the propulsion side, said fusion products pass through the aperture to the warm plasma.

The warm plasma performs two functions. First, it converts the energy of particles leaving the reactor into thrust by heating the reaction mass flowing through the warm plasma to the magnetic nozzle. Second, it reduces the temperature of the fusion products, mitigating the tendency of the plasma to be "frozen-in" to the magnetic field, enabling detachment from the magnetic nozzle. The proportion of warm plasma flow (species beta 226) to that of the fusion products (species alpha 202) can be varied, so that for a given reactor output on the jet side, thrust and specific impulse can be traded. The warm plasma propellant is replenished by either cold gas feed or neutral beam injection 226 via second injection system 228 which is a passageway through which neutral particles may flow. Similarly, a first injection system 230 replenishes said fusion fuel that has been converted to said fusion products.

The time necessary for the fusion energy deposition must be shorter than the residence time of the warm plasma, so that the rate of energy deposition is a major factor in the volume of the warm plasma, and therefore the size and mass of the overall propulsion system. Collisional processes between high energy fusion products and electrons in the warm plasma are much faster than those with warm plasma ions. The residence time of the warm plasma is determined primarily by the volume of the warm plasma, the ratio of the nozzle throat magnetic field to that of the warm plasma, and the warm plasma electron temperature. The latter determines the Bohm velocity at the magnetic nozzle throat. This set of parameters, along with the type of propellant, are operative in setting, maintaining, and controlling the state and flow rate of the collective warm plasma propellant and thermalized fusion species.

In order to function as a propulsion system, the plasma passing through the magnetic nozzle must detach from the magnetic field. For the ion species, this occurs mainly through inertial processes, but for the lighter electrons, it is necessary that the plasma be sufficiently collisional in the nozzle to enable cross-field transport of the electrons, so that ambipolar forces can allow them to detach with the ions. [Olson, et al] argue that anomalous diffusion processes are necessary in the magnetic nozzle to achieve the necessary flow rates. At a macroscopic scale, the criteria for inertial detachment of ions is that the Cowling number, the square of the ratio of the Alfven velocity to flow velocity, is greater than unity, i.e., the flow is super-Alfvénic. An important criterion for electron detachment is that the magnetic Reynolds number, the ratio of the product of the flow velocity and a characteristic length to the magnetic diffusivity is ideally less than unity. The method for promoting propulsion efficiency through effective plasma detachment therefore requires coordinated configuration of the magnetic nozzle magnetic field and that of the warm plasma propellant, so that state and transport properties of the latter are suitable for detachment at the nozzle exit.

The warm plasma propellant can be instantiated from any number of gases, including hydrogen, helium, nitrogen, oxygen, carbon dioxide, water, ammonia, and methane. These specific propellants are included, because of their relative abundance among planets and moons in the meso-solar system and outer system. Thus, they represent a class of in-situ propellants that could provide important logistical advantages in accessing the solar system. System considerations for specification of a propellant include ionization energy, mass, and the character of respective partition functions. In general, heavier species will enable higher thrust at lower specific impulse, and they require longer durations to thermalize high-energy, prompt fusion products. The longer thermalization times will require larger warm plasma volumes to maintain practical Damkohler numbers, and so compact systems will generally favor lighter propellants, such as hydrogen.

The fusion products born in the reactor well will have a pitch angle that is determined as the inverse cosine of the ratio of parallel velocity, relative to the magnetic field lines, to the total velocity. Below a critical pitch angle related to the reactor mirror ratio, the fusion product is by definition within the loss cone and will depart the well as a prompt fusion product. For such prompt, high energy fusion products entering the warm plasma, the transit time through the warm plasma will be much shorter than the collision times. However, the magnetic nozzle will have its own characteristic mirror ratio relative to the field confining the warm plasma. Some of the prompt, high energy fusion products leaving the reactor will also have pitch angles below the critical pitch angle of the nozzle and will depart the warm plasma through the nozzle without depositing any energy. The rest would reflect back into the warm plasma, the refection times and thermalization times determining the number of reflections before they are thermalized. These fusion products will therefore contribute to heating the warm plasma.

The percentage of fusion products that do not depart the warm plasma can be calculated as (g_J−g_n)/g_J. The loss cone fraction for the reactor jet side mirror g_J is a function of the mirror ratio of the jet side mirror relative to the reactor well. The nozzle cone fraction g_n is a function a function of the ratio of the magnetic field strength at the nozzle throat relative to that in the warm plasma. The retention of high energy prompt fusion products is therefore managed by specifying the magnetic field strength at respective stations in the flow path, starting from the reactor. The field strength of the warm plasma will be relatively low, nominally 1T or less, so that fairly high mirror ratios for the nozzle should be practical. Higher mirror ratios result in lower loss cone fractions. Higher mirror ratios in the nozzle will also allow longer residence times in the warm plasma. Since some small fraction of the prompt fusion products will escape the nozzle, this presents a potential operability problem, i.e., the tendency for the escaping prompt fusion products to remain "frozen in" on the magnetic nozzle field lines external to the nozzle. Unless mitigated, this situation could result in charge build-up that can reduce or eliminate effective thrust. The method for said mitigation is a catcher system wherein a collector 234 is placed normal to the returning magnetic field lines. Charged products—ions and electrons—will enter the collector and recombine, or as necessary, neutralized with a supply of oppositely charged species.

In-Line Power Conversion of Charged Species

The forward mirror 102 can be configured to allow the flow of fusion products 220 into a power conversion system 222 to power the reactor. This would enable one instantiation of the power conversion system such as a standing wave direct energy conversion (SWDEC) system as proposed by [Chap and Sedwick, 2015] or a more conventional magnetohydrodynamics (MHD) direct energy conversion (DEC). If an SWDEC or other DEC system is used for power conversion, the system and method on the power side are the same. Generally, high-energy, charged fusion products born inside the loss cone depart the reactor immediately. Thermalized particles at the high-end of the energy distribution enter the loss cone largely at a rate determined by coulomb collisions, and traversing the magnetic field in the mirror region, depart the reactor. The loss cone size is determined by the mirror ratio, i.e., the ratio of the magnetic field at the mirror with that between the mirrors. The magnetic field intensities of jet and power side mirrors may differ, and so too the respective mirror ratios and loss cone sizes.

As reported by [Chap and Sedwick, 2015], the SWDEC involves segregating ions leaving the reactor into packets whose spatial separation and velocities determine the spacing of multiple, inductive current loops coaxial with the ion flux. Electrons are extracted from the flux prior to its entering the collection zone. Said apparatus then creates an alternating current within the loops which is collected for powering the reactor. As energy drawn from the ions, the latter decrease in kinetic energy. A direct conversion system operates similarly, but the ion stream is continuous and the output is direct current. These methods are not constrained by the need for heat rejection and so are capable of high conversion efficiencies. This favors the total DFDCM power balance and minimizes the necessary capacity for the thermal management system. Because SWDEC and DEC apparatuses are coaxial with the reactor and propulsion system, system packaging and mass properties will be commensurately advantageous.

In all cases, combined mirror and centrifugal confinement must be sufficient to support sustained fusion reactions. For a reactor powered by charged fusion products and an SWDEC/DEC, the field strength of the power side mirror 102 must be predetermined to allow communication of sufficient fusion power to said SWDEC/DEC to power the reactor. Similarly, the field strength of the jet side mirror 104 must be sized to allow communication of sufficient fusion power to the warm plasma to deliver predetermined jet power. Both the fusion plasma and the warm plasma are confined by a plurality of magnets that in the preferred embodiment would be superconducting. In general, the magnetic field strength for the warm plasma and magnetic nozzle will be much lower than those in the reactor.

Radiation Power Conversion

Figure 3:
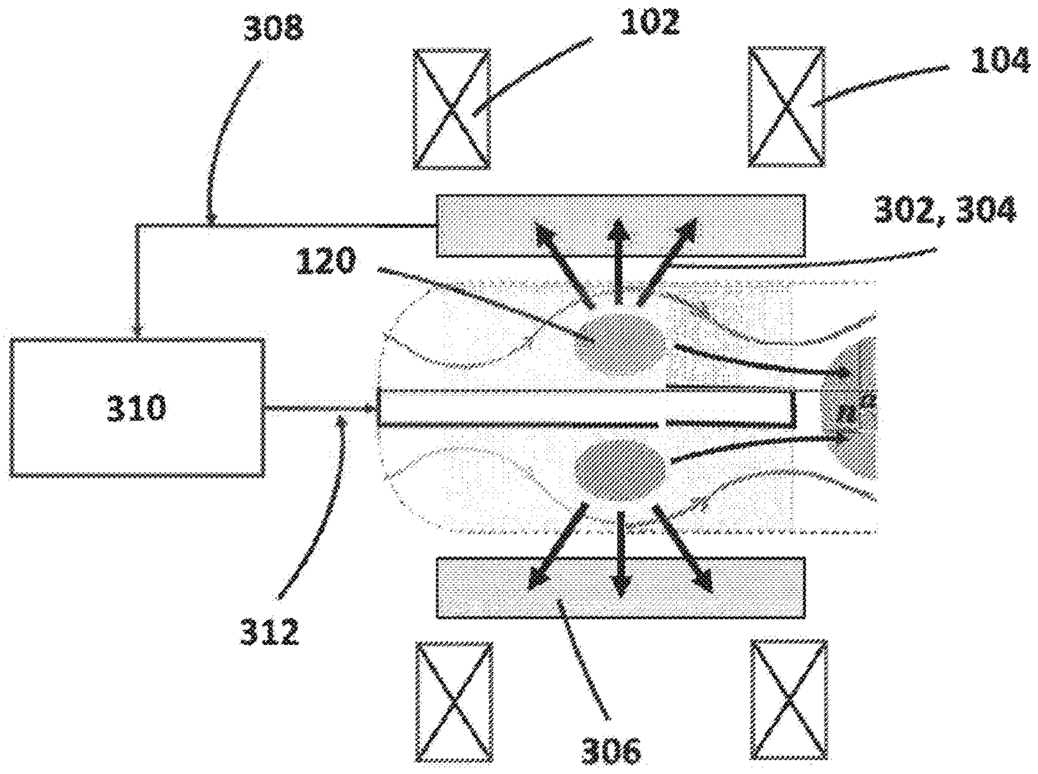
FIG. 3 is a schematic of a power recovery and conversion scheme based on hard radiation and neutron fluxes from the reactor well.

Hard radiation, i.e., Bremsstrahlung 302 and neutron energy 304 can be converted either through direct conversion methods or in heat-engine instantiations, the latter being subject to Carnot efficiency constraints. As shown in FIG. 3, these fluxes originate in the reactor plasma 120 and are collected in a shroud surrounding the plasma 306. Generically, the thermal energy produced is transmitted to a power conversion apparatus 310 that would then provide power and biasing via 312 to the central electrode 114 as well as to other spacecraft systems. In the case where the fuel is aneutronic, the conversion of the bremsstrahlung radiation 302 into electrical power would occur thermionically within the shroud 306 itself. Waste heat would be rejected out of the outer surface of the shroud eliminating the need for any additional radiators.

For a neutron generating fusion fuel, both the neutron 304 and the bremsstrahlung 302 radiation would be absorbed in the shroud 306 and then the heat transported via a fluid loop to the high temperature end of a thermodynamic cycle. For low power operation. Note that the mirror magnets and fusion products are included in FIG. 3 for context.

Power Conditioning

As reported in [Ellis, at al, 2001], the electrode system 114 must be biased at ultrahigh voltages in the 1-10 MV range. Depending on whether said electrode system is instantiated as a central core electrode or as concentric ring electrodes, the power delivered by the power conversion system must be conditioned to a single or multiple, graduated voltages, the range of the latter determined by the desired potential drop across the plasma. The central electrode architecture was demonstrated as described in [Ellis, et al, 2012]. Concentric ring electrodes were demonstrated as described in [Abdrashitov, et al, 1991], which specified another condition, i.e., that the Larmor radius of the ions must be larger than the separation between electrodes, in order to maintain the integrity of the electric field. These collective requirements are embodied in the power conditioning system for which the principal function of which is to serve as a voltage multiplier 238. The power conditioning system will have interface requirements with the power conversion system, which may in the case of the SWDEC include inverting alternating current output to direct current.

Power-Only Embodiment

Figure 4:
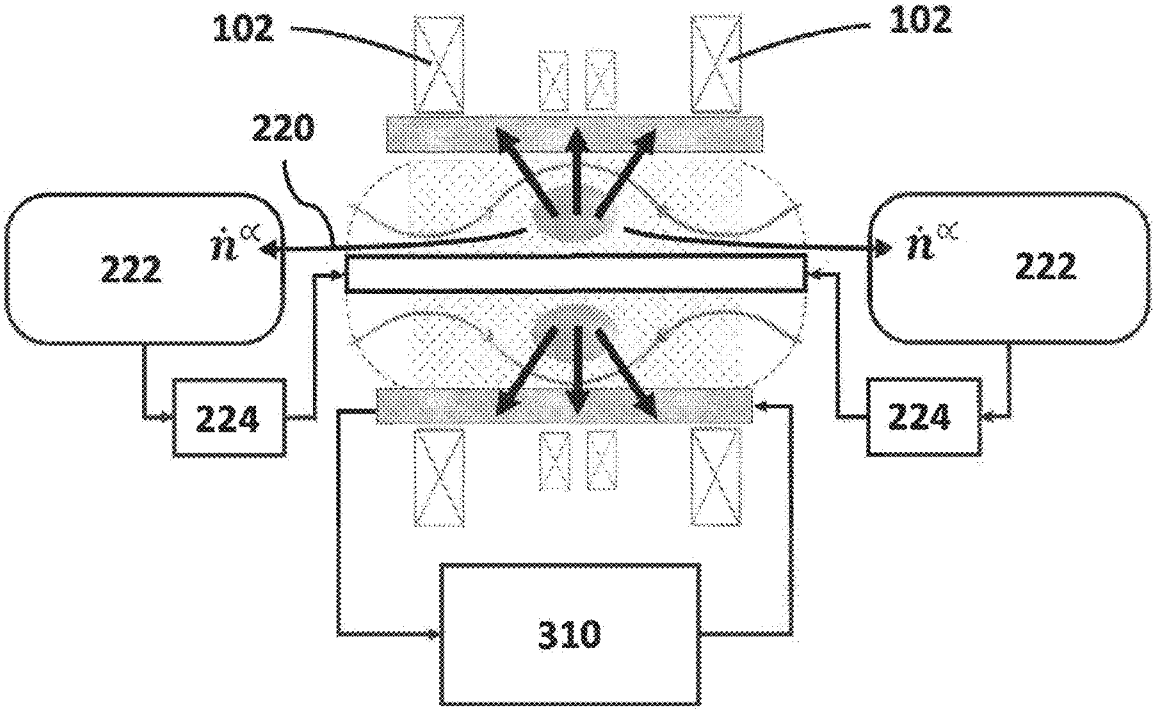
FIG. 4 is a schematic of a power-only embodiment that replaces the propulsion system instead with a second instance of in-line power conversion in addition to radiation and neutron flux power conversion.

Another embodiment of the invention is to remove the propulsion system and replace it with a second SWDEC/DEC system, as well as the appropriate radiation capture and power conversion technology. This embodiment is shown in FIG. 4.

In a particular embodiment, a system and method for employing centrifugal confinement fusion for in-space propulsion and power generation is disclosed. Centrifugal confinement represents an advancement beyond traditional mirror devices by further confining the fusion fuel and inhibiting instability growth, while still offering a simple magnet geometry and allowing a controllable fraction of the charged fusion products to leave each end of the mirror. These charged products are used to directly heat a higher mass flow rate, lower temperature propellant in the aft direction, which is then expanded through a magnetic nozzle to produce thrust. The lower temperature of the exhaust flow supports an increased level of collisionality to promote plume detachment, and the level of thrust can be traded against specific impulse for mission optimization. Power from the forward flowing charged species is directly converted to electricity to help drive the rotating plasma. Additional power conversion systems are employed to extract energy from the neutron products of fusion fuels such as D-T and D-D, or from the Bremsstrahlung radiation of fuels such as D-$^{3}$He and p-$^{11}$B.

The invention claimed is:

1. An in-space propulsion and power system employing a fusion plasma and a warm propellant plasma for the direct production of thrust;

said propulsion and power system comprising a nuclear fusion reactor, a propulsion system, and a power conversion system;

said fusion plasma comprising a collection of fusion fuel, fusion products and electrons;

said warm propellant plasma comprising a mixture of said fusion products and a propellant;

said reactor being open to the vacuum of space and comprising a centrifugal mirror system to confine said fusion plasma;

said centrifugal mirror system comprising a first plurality of coaxial magnetic coils that produce a first poloidal magnetic field, and a plurality of radially concentric electrodes that produce a first poloidal electric field;

said propulsion system being open to the vacuum of space and comprising a second plurality of coaxial magnetic coils configured to:

a) produce a second poloidal magnetic field to confine said warm propellant plasma, and b) form a magnetic nozzle to accelerate said warm propellant plasma to produce said thrust;

said power conversion system comprising a power converter configured to convert power produced within said fusion plasma to electrical power and to communicate said electrical power to said radially concentric electrodes of said centrifugal mirror system;

said propulsion and power system further comprising:

a region in which a portion of said fusion products are conveyed from said nuclear fusion rector to said warm propellant plasma via the first poloidal magnetic field;

a region in which a second portion of said fusion products are conveyed from said nuclear fusion reactor to said power conversion system via the first poloidal magnetic field;

a first injection system to replenish said fusion fuel that has been converted to said fusion products;

and a second injection system to replenish said propellant that has been expelled through said nozzle to produce said thrust.

2. The centrifugal mirror system of claim 1 wherein said first poloidal electric field is substantially perpendicular to said first poloidal magnetic field at most locations within said reactor.

3. The propulsion and power system of claim 1 wherein said fusion fuel is selected from the group consisting of deuterium alone, deuterium with tritium, deuterium with helium-3, and proton with boron-11.

4. The centrifugal mirror system of claim 1 with one or more of said first plurality of coaxial magnetic coils comprising a high temperature superconducting material, an insulation configured to thermally insulate said material, and a cooling system operable to maintain said material below its critical temperature.

5. The propulsion system of claim 1 with one or more of said second plurality of coaxial magnetic coils comprising a high temperature superconducting material, an insulation configured to thermally insulate said material, and a cooling system operable to maintain said material below its critical temperature.

6. The propulsion and power system of claim 1 wherein said power conversion system is configured to extract the kinetic energy of a predetermined fraction of electrically charged components of said fusion products to generate electrical power.

7. The propulsion and power system of claim 1 wherein said power conversion system comprises a shroud to extract the kinetic energy of a predetermined fraction of neutrons of said fusion products to generate electrical power.

8. The propulsion and power system of claim 1 wherein said power conversion system comprises a shroud to extract the power of a predetermined fraction of a bremsstrahlung photon radiation emitted from said fusion plasma to produce electrical power.

* * * * *